United States Patent [19]

Heisey

[11] 4,059,516
[45] * Nov. 22, 1977

[54] PROCESS FOR TREATING WOOL SCOURING WASTES

[75] Inventor: Willis A. Heisey, Denver, Pa.

[73] Assignee: Geo. W. Bollman & Co., Inc., Adamstown, Pa.

[*] Notice: The portion of the term of this patent subsequent to Sept. 30, 1992, has been disclaimed.

[21] Appl. No.: 687,538

[22] Filed: May 19, 1976

[51] Int. Cl.$^2$ .............................. C02B 1/20
[52] U.S. Cl. ........................ 210/53; 210/56; 8/139
[58] Field of Search ............. 210/42 R, 51-53, 210/56; 8/139

[56] References Cited

U.S. PATENT DOCUMENTS

| 2,429,868 | 10/1947 | Campanella | 210/53 |
| 2,762,681 | 9/1956 | Crowley | 210/42 R |
| 2,903,424 | 9/1959 | Fong | 210/43 |
| 3,440,167 | 4/1969 | Clark et al. | 210/42 R |
| 3,677,940 | 7/1972 | Fujimoto et al. | 210/52 |
| 3,909,407 | 9/1975 | Heisey | 210/53 |

Primary Examiner—Thomas G. Wyse
Attorney, Agent, or Firm—James J. Kennedy

[57] ABSTRACT

An improved process for treating wool scouring wastes liquors in which the waste liquors are first cooled before acid and collodial bentonite are added; then the flocculated liquor is reheated to a temperature in the range of 130° to 150° to separate the waste liquor into a supernatent liquor and a settled drainable sludge and finally dewatering the settled sludge by centrifugal separation.

2 Claims, 1 Drawing Figure

TEMPERATURE(°F) OF ACIDULATION
VS
C.O.D. OF CENTRATE

EFFECT OF TEMP. OF ACIDULATION OF
WOOL SCOUR LIQUOR ON FLOCCULATION
EFFICIENCY (C.O.D.)

X  0.0 % BENTONITE
O  0.15% BENTONITE
□  0.30% BENTONITE

EFFECT OF TEMP. OF ACIDULATION OF WOOL SCOUR LIQUOR ON FLOCCULATION EFFICIENCY (C.O.D.)

X  0.0 % BENTONITE
O  0.15% BENTONITE
□  0.30% BENTONITE

PROCESS FOR TREATING WOOL SCOURING WASTES

BACKGROUND OF THE INVENTION

This invention relates to an improved process for treating wool scouring waste liquors which, in addition to being commercially feasible, will significantly reduce treatment costs compared to other presently known commercial methods. The improved process also enhances the possibility of recovering a significant amount of wool grease from the waste sludge, which at today's market prices, makes such a recovery a valuable by-product.

Wool scouring is one of the first steps that must be carried out before raw wool can be used in textile operations. The scouring or washing process is performed to remove the many varied impurities the wool contains. Some of those impurities include dirt, sand, vegetable matter, animal wastes, paint (used in branding), suint (a water soluable material secreted by the animal's sweat gland) and grease (a complex water-insoluable mixture which protects the wool fibers during growth). The scouring process is normally carried out at an elevated temperature, generally in the range of 130° to 150° F, by passing the raw wool through a series of bowls or tanks containing suitable detergents and alkalis, while alternately squeezing the wool by running it between rollers. This process is well known in the art and is almost universal in its application.

The resultant spent waste liquor produced during this scouring process produces one of the most objectionable and polluted wastes known (comprised of as much as one-third of the total solids in the form of wool grease) and its disposal presents significant problems to the textile industry.

The waste liquor is comprised of all the impurities described above, plus the derging chemicals used during the scouring process. Because the centrifugal separators recover only 25-30% of the recoverable wool grease, the resultant waste liquor may contain 0.5-1.5% of wool grease and other soluable organic compounds. The rusulting waste liquor cannot be, by law, discharged directly into open bodies of water or into municipal sewer systems, unless the waste is treated or conditioned to reduce its chemical oxygen demand (COD), the measure of polution, to acceptable limits.

As the cost of the mandatory processing of wool scouring wastes increase, the economics of attempting to reclaim the wool grease as a valuable by-product also increases as the industry strives to reduce its total operating costs. Historically, only a small percentage of the total wool grease production is ever realized. The reason stems partially from the available technology for grease recovery which have been in use heretofore.

There are several known methods for treating scouring wastes and recovering grease. They include centrifuging, acid cracking and precipitation processes. Of these processes, the most successful results have been achieved using acid cracking in which the waste liquor is treated with suitable acid, usually sulfuric, to obtain pH in the range of 3.5. According to this process, the wool grease, dirt and other solids are permitted to settle out. The recovered solids are then further treated to remove the grease using a vacuum filter or filter press. This filtration process will generally remove approximately 50% of the total available grease from the other solids, making it one of the most efficient processes. The filtration process, on the other hand, is cumbersome and does not lend itself to large commercial operations, because large amounts of filter aid are required to prevent clogging of the filters.

SUMMARY OF THE INVENTION

The present invention is intended to overcome the deficiencies known effluent purification processes and to enhance grease recover, and it is therefore the primary object of the invention to provide an improved process for treating wool scouring wastes which will yield a maximum grease recovery with a minimum of chemicals, thereby providing a commercially acceptable wool scouring waste treatment with significant cost advantages.

Another object of the invention is to provide for maximum grease recovery without comprising the quality of the wool grease.

A further object of the invention is to provide an improved treatment process which will produce sufficient purification of the waste liquor into liquid and solid components to permit discharge of these components by conventional methods.

These and other objects of the invention will become apparent from the complete description found in the specification set out herein and the appended claims.

DESCRIPTION OF THE INVENTION

Figure 1:
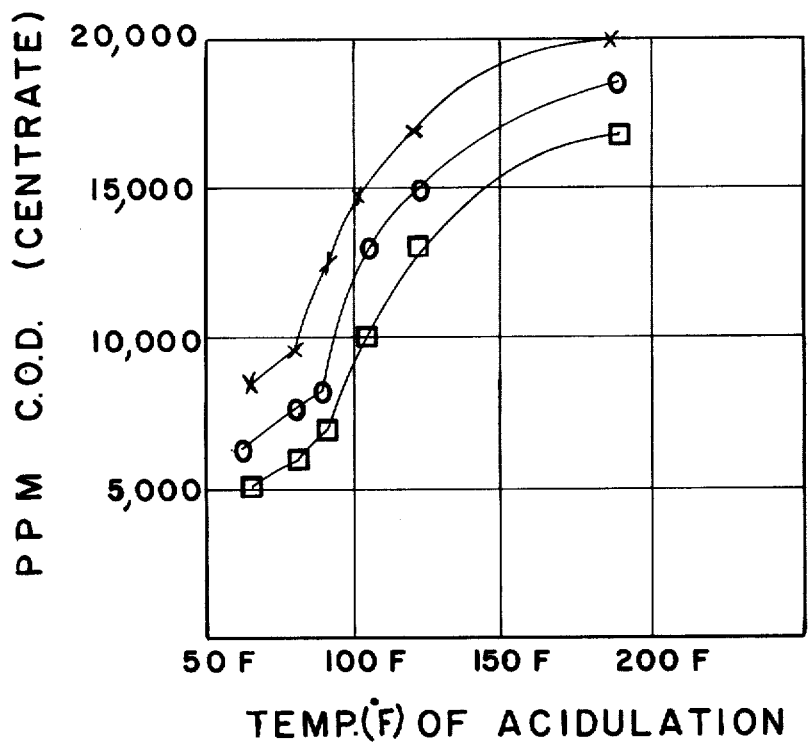
FIG. 1 is a graphical representation of the effect of the temperature at acidulation of wool scouring liquors on flocculation efficiency.

In accord with the present invention, raw wool is first scoured using conventional techniques to remove the wool grease, suint, earthy materials and any other impurities that may be present by use of detergents. As is conventional, this scouring process takes place in tanks or bowls at an elevated temperature, usually in the range of 130° to 150° F. The heated spent waste liquor is drawn off in a generally continuous manner and passed through a heat exchanging device to cool the liquor from the scouring temperature to a temperature in the range of 80° to 100° F. This cooling step can be achieved by passing chilled incoming water bound for the scouring bowls first through the heat exchanger where it is preheated as the cooling medium for the waste liquor, then it is delivered to the scouring bowl to be used in the scouring process.

While it is known that acid cracking processes will produce an effluent which has a COD level which is more acceptable for disposal compared to a straight mechanical process, the acid cracking process waste is still inadequately purified, because of the remaining high organic content and high acidity. An accepted method to better purify the acid cracked waste liquor includes the addition of dispersible-type bentonite in conjunction with the acid cracking. The bentonite is an inexpensive supplement which will significantly improve grease removal.

After the spent liquor is cooled, it is acidified by adding a suitable acid, hydrocholoric or sulfuric, in a controlled fashion to achieve a pH in the range of 3.5 to 3.9. Experimentation has shown that the optimum temperature for the acidulating step is at approximately 90° F. This means that the wool scouring wastes must first be cooled to this temperature before adding acid.

Collodial bentonite of any suitable quality is similarly added in controlled fashion to the cooled waste liquor either concurrently with the acid, or subsequently to the addition thereof. The temperature is maintained at approximately 90° F for good flocculation. Bentonite is added as a percentage of weight to volume of the liquor being treated. In this case, it has been found that the percent of bentonite to be added is in the range of 0.1 to 0.3%.

Also, while maintaining the 90° F temperature, lime is added to waste liquor. In this case the lime is added only for neutralization or pH adjustment and not for sludge conditioning. The lime is added at a rate required for pH adjustment to 5.8–6.3 for subsequent aerobic oxidation.

The use of the bentonite in the acid cracking process assists in the production of a compact, rapidly settling sludge and a clarified supernatent liquor. The sludge can be efficiently dewatered as will be more fully explained hereinafter. This results in a maximum reduction in COD from the initial levels. Experimentation has substantiated that flocculation at a temperature below 100° F improved the result of this process significantly, producing a more compact, settled sludge then a sludge produced at a higher temperature. The higher the temperature of flocculation, the less efficient is the process as part of an acid cracking process.

The lower temperature during flocculation step has not been acceptable, however, where the sludge is to be dewatered efficiently and recoverable grease is to be extracted. The present invention has solved that problem by improving known methods by adding an additional step in which the flocculated liquor is reheated and then the sludge is centrifugally separated at the elevated temperature. Grease recovery is maximized without degrading quality.

In accordance with the improved process, after adding the appropriate quantities of bentonite and lime, the flocculated liquor is heated to a temperature in the range of 120° to 150° F to prepare the waste liquor for centrifugal separation instead of subjecting it to the usual filtration process used in grease recovery processes.

A resultant clarified effluent is drawn off after the heating step, leaving a heated, settled sludge. The remaining sludge is then discharged into a centrifuge where it is dewatered by centrifugal separation.

In waste scouring liquors, the amount of pollution is influenced by the rate of fresh water added to the scouring liquor so that the percentage of wool grease in the waste liquor will vary. This grease content contributes greatly to the pollution, but it is readily removed by acidulation at the temperatures described hereinafter. Thus, waste scouring liquors with an initial 20,000–200,000 ppm COD can be clarified using this procedure. The remaining ppm COD remaining in the effluent is soluble, but the amount can be reduced by the use of adsorbent bentonite. The effluent can be reduced by 6,000–12,000 ppm COD and 0.03% grease content.

The variables which influence the degree of flocculation are the temperature at flocculation, pH and the percentage of bentonite added. If the waste liquor is flocculated at the temperature at which it comes from the scouring bowls, approximately 150° F, with a pH of 3.9, then the percentage of bentonite that must be added is much higher, then if the acid and bentonite are added to the waste liquor cooled to approximately 90° F. Thus, the amount of chemicals required by this improved process are reduced.

The acid cracking process using bentonite as supplement is a simple, inexpensive process for treating wool scouring wastes, because the acid and bentonite are readily available, relatively inexpensive chemicals. The centrifugal separation is a more effective means of dewatering the sludge then the filtration process, and it too is less expensive to operate, adding further to the efficiencies of the process. The reheating of the flocculated waste liquor is then the key to the simplified approach described above, because the higher temperature sludge settles to less sludge volume and it can be dewatered more efficiently then if centrigual separation occured at the lower temperature of flocculation.

FIG. I illustrates the effect of temperature of acidulation (beginning with elevated temperatures and gradually reducing the initial temperature at the time acid is added) on the reduction of COD of wool scouring waste liquors at differing levels of bentonite concentration. While not specifically shown, larger amounts of bentonite did not improve the results obtained at concentration levels of approximately 0.3%. This data suggests that the acidulation step should be completed at a temperature not greater than 90° F, because the higher the temperature at acidulation, the less effective is the COD reduction.

Waste liquor is retained in the acidulator for approximately five minutes after the acid is added, then acidified liquor is discharged to a second tank for neutralization with lime and reheating the liquor to 130° – 150° F. This flocculation and subsequent neutralization at the elevated temperature reduces the grease content to less than 0.5%. Successful waste treatment requires the wool grease content to be reduced to this level, because it is considered very slowly biodegradable in aeration systems. The heating step to 130°–150° F is required to produce a rapid settling sludge which can be dewatered efficiently in a solid bowl centrifuge.

EXAMPLE

The following table shows the settling rate and the drainability (a non-drainable sludge is desired) of centrifuged solids of wool scouring waste liquors acidified to a pH of 3.4 at a temperature of 90° F, and then treated for five minutes at the temperatures shown in Table I in the presence of 0.5% lime.

TABLE I

Settling rate of flocced solids at 90° F from acid-bentonite system. The waste liquor was heated from 90° to the temperatures indicated with 0.5% lime in a second tank as set forth in the example below:

| Settling Temp. After | Sludge Volume After | | Drainability of |
|---|---|---|---|
| Acidulation at 90° F | ½ hour | 1 hour | Centrifugal Solids |
| 90° F | 60 | 50 | Drained |
| 110° F | 45 | 40 | Drained |
| 130° F | 30 | 25 | Non-drainable |
| 150° F | 25 | 20 | Non-drainable |

Wool scouring waste liquor having an initial COD of 41,000 ppm with 0.7% grease content is cooled from a scouring temperature of 140° F to 90° F using a heat exchange method as suggested hereinbefore. Acid is added to the cooled liquor to achieve a pH in the range of 3.4 – 3.9. Next, collodial bentonite of suitable grade is added at the rate of 0.15 –0.30% (weight to volume).

The acidulated liquor is retained for five minutes in the acidulation tank. The liquor is then discharged to another tank where lime is added producing a pH in the range of 5.8 - 6.3. The neutralized liquor is next heated to 130°-150° F, producing a rapidly settling sludge. A supernatent liquor is drawn off for discharge to an aeration lagoon and aerobic digestion, while the settled, conditioned sludge is continuously drawn off and dewatered in a solid bowl centrifuge.

This conditioned sludge will yield a refinable wool grease. This is possible, because the time and temperature during which the grease is subjected to the acid does not adversely affect the color of the wool grease and its refinability. Previously known methods subjected the acid wool grease to backwashing with steam to release it from the filter press cake.

The dewatered sludge is then slurried with a minimum amount of water and soda ash, producing a pH in the range of 6.0 to 6.5. It has been found that pH values above or below this range will produce poorer yields of centrifugal wool grease. Boiling in this pH range is required to prepare a grease which can be released from the sludge. Boiling time ranges from approximately 15-30 minutes, with yield improvement realized at 30 minutes.

In practice, the centrifugally recovered grease represents an improved yield of up to 80% of the available wool grease as compared to usual quantities now recovered which range from 25-30%.

The middle discharge from the grease recovery centrifuge can be returned to the acidulator for secondary grease recovery, while the bottom discharge is treated by the process such as described in U.S. Pat. No. 3,909,407 to Heisey to produce a clarified effluent for aerobic digestion and solids for landfill.

I claim:

1. An improved process for treating wool scouring waste liquors having an initial COD in excess of 20,000 ppm, including the steps of cooling the waste liquor to a temperature in the range of 80° to 90° F after discharge from a scouring bowl at a temperature in the range of 130° to 150° F, adding acid and collodial bentonite to said cooled waste liquor, maintaining a pH range of 3.5 to 3.9 and bentonite at a weight to volume ratio in the range 0.10 to 0.3%, adding lime to adjust the pH range to 5.8 to 6.3 and flocculating the waste liquor, the improvement comprising the steps of heating the flocculated waste liquor to a temperature in the range of 130° to 150° F, separating the waste liquor into a supernatent liquor and a settled non-drainable grease containing sludge, and dewatering the settled grease containing sludge by centrifugal separation.

2. An improved process for treating wool scouring waste liquors, comprising the steps of cooling the waste liquor having an initial COD in excess of 20,000 ppm to a temperature of approximately 90° F after discharge from a scouring bowl at approximately 130° to 150° F, adding acid and collodial bentonite to the cooled liquor while maintaining a pH of approximately 3.9 and bentonite weight to volume ratio in the range of 0.15 to 0.3%, adding lime to neutralize the liquor maintaining a pH range of 5.8 to 6.3 and flocculating, reheating the flocculated waste liquor to a temperature in the range 130° to 150°, producing a supernatent liquor and a settled non-drainable grease containing sludge and dewatering the settled grease containing sludge by centrifugal separation.

* * * * *